United States Patent [19]

LaCroix et al.

[11] Patent Number: 5,198,199

[45] Date of Patent: Mar. 30, 1993

[54] PROCESS FOR THE RECOVERY OF ANTIMONY-BASED CATALYSTS USED FOR THE FLUORINATION OF HALGENATED HYDROCARBONS

[75] Inventors: Eric LaCroix, Lyons; Andre Lantz, Vernaison, both of France

[73] Assignee: ELF Atochem S.A., France

[21] Appl. No.: 827,775

[22] Filed: Jan. 29, 1992

[30] Foreign Application Priority Data

Jan. 30, 1991 [FR] France .................. 91 01031

[51] Int. Cl.[5] .................................................. C01B 29/00
[52] U.S. Cl. ........................................ 423/88; 423/87; 423/491; 502/35
[58] Field of Search ............... 502/35; 423/87, 88, 423/491

[56] References Cited

U.S. PATENT DOCUMENTS

| | | | |
|---|---|---|---|
| 3,784,671 | 1/1974 | Joerchel et al. | 423/87 X |
| 4,070,439 | 1/1978 | Osaka et al. | 423/88 |
| 4,722,774 | 2/1988 | Hyatt | 423/87 X |

*Primary Examiner*—W. J. Shine
*Attorney, Agent, or Firm*—Morgan & Finnegan

[57] ABSTRACT

To recover the antimony contained in a solution of use antimony-containing catalyst, emanating from units for the fluorination or chlorofluorination of halogenated hydrocarbons comprising at least two carbon atoms, the solution is concentrated to the limit of distillation of antimony trichloride, an excess of chlorine is then added to convert $SbCl_3$ to $SbCl_5$, and $SbCl_5$ is distilled under reduced pressure without exceeding 120° C.

The recoverd antimony pentachloride is sufficiently pure to be able to be recycled directly to the fluorination reactor.

10 Claims, No Drawings

PROCESS FOR THE RECOVERY OF ANTIMONY-BASED CATALYSTS USED FOR THE FLUORINATION OF HALGENATED HYDROCARBONS

FIELD OF THE INVENTION

The present invention relates to the manufacture of fluoroalkanes, and more especially to a process enabling the antimony-containing catalysts employed for the fluorination of halogenated hydrocarbons to be recovered and recycled.

BACKGROUND OF THE INVENTION

At the present time, much research is being carried out in order to synthesize substitutes for chlorofluorocarbons (CFC's). These substitution products include fluoroalkanes comprising at least two carbon atoms. Among the synthesis processes, the fluorination of halogenated hydrocarbons with hydrofluoric acid in the presence of an antimony-based catalyst is an industrial method of synthesis.

In these processes, the catalytic species consists of an antimony V halide. This catalytic species is prepared either before the fluorination reaction, or in situ from antimony trichloride, chlorine and a fluorinating agent such as hydrofluoric acid, or by direct fluorination of antimony pentachloride. As in any catalytic process, a deactivation of the catalyst is observed, due to the accumulation of impurities (water, metal salts) and to the formation of organic compounds having high boiling points, which leads to a catalytic activity below the threshold of profitability. For this reason, it proves necessary to purge the reactor and add fresh catalyst.

The deactivated antimony-containing catalyst mixture comprises halides of pentavalent antimony ($SbCl_xF_y$; $0 \leq x$, $y \leq 5$ and $x+y=5$) and also halides of trivalent antimony; moreover, this mixture also consists of organic compounds comprising organic reagents, reaction products and, in particular, unsaturated compounds. The presence of hydracids (HCl, HF) and the antimony content depend on the different processes of catalysis.

Treatment of the used catalyst for storage in dumps often leads to large quantities of wastes with a high storage cost. To safeguard the environment and on economic grounds, recovery and recycling of the catalyst are becoming increasingly desirable. However, current processes for retreatment of the catalyst are either too complex to be carried out or lead to a recovered catalyst which necessitates a subsequent treatment before recycling.

Thus, Patent FR 2,281,893 describes a process for recycling antimony in the form of antimony pentachloride. The purity of the regenerated catalyst is high (>95%), but the process necessitates a large number of steps: chlorination of trivalent antimony to pentavalent antimony; fluorination of pentavalent antimony and organic substances having high boiling points with hydrofluoric acid; concentration of the reaction medium; chlorination of the antimony-containing compounds to antimony pentachloride; and distillation of the latter.

Patent DE 2,140,188 describes a process for recycling antimony in the form of antimony trichloride. Here too, the process is relatively complex, since it necessitates a hydrolysis of the catalyst followed by a precipitation of the antimony in the form of an oxide, then dissolution of the precipitate, reduction of pentavalent antimony, precipitation of trivalent antimony, dissolution in hydrochloric acid and finally distillation of antimony trichloride.

Patent DE 2,110,797 claims a process based on a conversion of the used antimony to antimony pentachloride. The reaction mixture is concentrated in the presence of CCl to convert antimony fluorides to antimony chlorides, to remove a portion of the organic substances and to decompose antimony pentachloride thermally to antimony trichloride and chlorine. After removal of a second portion of organic substances by filtration/washing with $CCl_4$, the antimony trichloride is chlorinated to antimony pentachloride, the latter then being separated by distillation.

Finally, Patent FR 2,320,777 describes a process for recovery/recycling of the antimony-containing catalyst in the form of antimony pentachloride. The crude reaction mixture containing the used catalyst is heated while an inert gas (nitrogen, F 113, etc.) is bubbled through it, with the addition of HF if required, in order to convert the organic substances having high boiling points to fluorinated compounds having lower boiling points. The catalyst is then chlorinated in the presence of chlorine and carbon tetrachloride to convert it to antimony pentachloride; the latter is then recovered by distillation.

In all the patents cited above, the recycling of the antimony-containing catalyst is often relatively complex, but most particularly it necessitates, in all cases, the introduction of intermediary substances (hydrofluoric acid, reducing agents, precipitating agents, chlorine, carbon tetrachloride, solvent, inert gas, etc.) or additional steps (thermal reduction, washing, etc.) which are involved only as regards the recovery and purification of the antimony. These intermediary substances and additional steps are not involved in the fluorination reaction for which the catalyst is used, and no financial return can hence be set against their cost.

DESCRIPTION OF THE INVENTION

The subject of the present invention is now to provide a simple process for recovering and recycling the antimony-containing catalyst emanating from units for the fluorination or chlorofluorination of halogenated hydrocarbons comprising at least two carbon atoms. This process comprises the following steps:

(a) Concentration of the solution of used catalyst to the limit of distillation of antimony trichloride;

(b) Addition of chlorine to the concentrated solution to convert antimony trichloride to antimony pentachloride; and (c) Distillation of the antimony pentachloride.

The concentration step (a) makes it possible not only to remove the organic substances having low boiling points, but also to reduce pentavalent antimony by reaction with the olefins present in the reaction medium and to convert the whole of the catalyst to antimony trichloride by fluorination of the incompletely fluorinated organic substances also present in the reaction medium ($SbCl_xF_y \rightarrow SbCl_3$).

The organic substances having a boiling point close to that of antimony pentachloride are distilled before the chlorination step. Thus, the distillation step (c) enables 80 to 95% of the antimony to be recovered in the form of highly pure (>97%) antimony pentachloride, which can be recycled to the fluorination reactor.

This new process, which does not necessitate the introduction of intermediary substances or additional steps for which no financial return can be shown against cost, will now be described in greater detail.

The used antimony-containing catalyst to which the retreatment process according to the present invention may be applied comes predominantly from units for the manufacture of fluoroalkanes comprising, inter alia, dichlorotetrafluoroethanes (F114 and F114a), 1-chloro-2,2,2-trifluoroethane (F 133a), 1,1,1,2-tetrafluoroethane (F 134a), 1,1-dichloro-1-fluoroethane (F 141b), 1-chloro-1,1-difluoroethane (F 142b), 1,1,2-trichloro-2,2-difluoroethane (F 122) and 1,1-dichloro-2,2,2-trifluoroethane (F 123). Their synthesis is generally based on a fluorination with hydrofluoric acid of alkanes, alkenes or alkynes comprising at least two carbon atoms, partially or fully halogenated and, at all events, fluorinated to only a limited extent, if at all, such as trichloroethylene (F 1120), tetrachloroethylene (F1110), 1,1-dichloroethylene (F 1130a), 1,1,1-trichloroethane (F 140a) or any other compound of this type. These reactions can be catalyzed by an antimony halide, the precursor of which can be, inter alia, $SbCl_5$, $SbCl_3 + Cl_2$, and the like.

In the present process for recovering antimony in the form of $SbCl_5$, the solution of deactivated catalyst may contain, as preponderant inorganic compounds, chlorides and/or fluorides of trivalent and/or pentavalent antimony. The content of antimony metal can vary between 0 and 50%, but it is more generally between 3 and 30%, and the commonest contents are of the order of 3 to 15%. The proportion of $Sb^V$ relative to total Sb can vary from 0 to 100%, but generally, at emergence from the reactor, the absence of chlorine and the presence of reactive olefins or of olefin precursors (compounds capable of being dehydrochlorinated or dehydrofluorinated in the presence of $Sb^V$) lead to a partial reduction of antimony V to antimony III; for this reason, the proportion of $Sb^V$ generally represents only 0 to 50% of total Sb, and more preferably from 0 to 20%. Moreover, the solution of deactivated catalyst contains various organic compounds comprising, inter alia, olefins such as $CHCl=CCl_2$ (F 1120), $CCl_2=CCl_2$ (F 1110), $CH_2=CCl_2$ (F 1130a), $CF_2=CHCl$ (F 1122), $CH_2=CFCl$ (F 1131a) and $CF_2=CCl_2$ (F 1112a), capable of reacting with $Sb^V$ derivatives and reducing the latter to the state of $Sb^{III}$. The solution of deactivated catalyst may also contain haloalkanes such as $CH_3—CCl_3$ (F140a), $CH_3—CCl_2F$ (F141b), $CH_3-CClF_2$ (F142b), $CF_3—CH_2Cl$ (F133a), $CF_2Cl—CH_2Cl$ (F132b), $CH_2Cl—CCl_2F$ (F131a), $CH_2Cl—CCl_3$ (F130a), $CHCl_2—CHCl_2$ (F130), $CF_2Cl—CHCl_2$ (F122), $CF_3—CHCl_2$ (F123) and $CF_2Cl—CHFCl$ (F123a), which are potential olefin generators by dehydrohalogenation catalyzed by species based on antimony V. In all cases, the mole ratio (olefins + olefin precursors)/$Sb^V$ should be greater than 1 in order to have a complete reduction of antimony V at the end of the concentration step (a) described below; however, since there are other methods of conversion of olefins (for example polymerization) than reaction with $Sb^V$ derivatives, a mole ratio equal to at least 4 is preferable. Finally, the solution of deactivated catalyst may contain organic compounds having high boiling points; these heavy products which are formed during the main fluorination reaction by a chlorination of olefins and hydroalkanes, are the main cause necessitating a purge of the reactor.

The first step (a) of the process according to the invention consists in a concentration of the solution of deactivated catalyst to the limit of distillation of antimony trichloride. In order not to necessitate too great a heat input and not to form excessive tarry products, this concentration may be carried out by distillation under reduced pressure; it is also possible to operate in two stages, first at atmospheric pressure or under moderately reduced pressure (between 100 and 6.7 kPa) and then under a further reduced pressure (below 6.7 kPa). Naturally, this concentration leads to removal of the organic compounds which have a boiling point below that of $SbCl_3$ (b.p. 143.5° C. at 9.33 kPa), but it should concomitantly make it possible, on the one hand to reduce $Sb^V$ to $Sb_{III}$ by chlorination of olefins, and on the other hand to convert $SbCl_xF_y$ to $SbCl_{x+y}$ by fluorination of the organic substances fluorinated to only a limited extent, if at all; for this reason, it is necessary to perform this concentration at a temperature of between 70 and 140° C. Thus, the antimony compounds are converted virtually completely to antimony trichloride and, moreover, the organic compounds having boiling points close to that of $SbCl_5$ are removed.

The second step consists in the addition of chlorine to the concentrated solution to convert $SbCl_2$ to $SbCl_5$. The mole ratio $Cl_2/SbCl_3$ should be equal to at least 1.3. Chlorine is introduced into the crude reaction mixture via a tube dipping below the surface and the temperature of the medium is maintained at between 75 and 120° C., and preferably between 80 and 100° C. After this operation, the reaction medium consists of the catalyst in the form of $SbCl_5$, metallic impurities (Fe, etc.) and organic substances having high boiling points (boiling point above that of $SbCl_3$).

The third step consists in the distillation of antimony pentachloride under reduced pressure in order to avoid its decomposition. The distillation pressure can be between 1 and 14 kPa, and more especially between 2 and 8 kPa; in all cases, the temperature does not exceed 120° C. It is advantageous at the end of the distillation to introduce a small amount of chlorine, sufficient to reoxidize the $SbCl_3$ formed by thermal reduction of $SbCl_5$ during the distillation. Distillation is continued until distillation of $SbCl_5$ is complete under the operating conditions adopted.

The residual distillation bottom product is composed, on the one hand of tarry organic products due to polymerization and decomposition reactions, and on the other hand of metal compounds, in particular stable iron/antimony complexes. By an alkaline treatment, the antimony derivatives can be converted to oxides or hydroxides and then isolated.

The process according to the present invention enables 80 to 95% of the used antimony contained in the crude reaction product to be recovered. By profiting from the difference between the boiling point of $SbCl_3$ and that of $SbCl_5$, this antimony is obtained after distillation in the form of $SbCl_5$ with a purity greater than 97%, and it can hence be recycled directly.

EXAMPLES

The examples which follow illustrate the invention without limiting it.

Example 1

The used catalyst in crude form to be treated contains 12.2% by weight of antimony (including 95% in the form of $Sb^{3+}$) and approximately 200 ppm of metallic impurities (mainly Fe and As), the remainder predominantly comprising identified organic compounds and a small proportion of unidentified organic compounds ("heavy products.). The distribution (mol %) of the identified organic compounds is as follows: F141b (11%), F1130a (4%), F140a (5%), F131a (33%), F1120 (7%), F130a (39%) and F130 (1%).

The apparatus used comprises a jacketed 1-liter stainless steel reactor equipped with a stirrer, a tube arranged to dip below the surface enabling chlorine to be introduced and a drainage valve. This reactor is surmounted by a stainless steel column packed with stainless steel rings and extended with a column head, a water-cooled condenser and a stainless steel receiver flask. The apparatus comprises, in addition, at several points, means for monitoring the temperature and pressure.

The reactor is charged with 1000 g of used catalyst, and a first distillation is then performed under a pressure of 10.7 kPa, comprising a temperature plateau of one hour at 80° C. (in order to reduce all of the $Sb^V$ and to remove inorganic fluorides) and then a temperature rise to reach 98° C. at the foot of the column. A first distillate of 635 g containing only 200 ppm of total antimony is thereby collected. A second distillation, under a pressure of 4 kPa, enables a second distillate of 61 g containing 0.8% of total antimony to be removed. The foot temperature is limited to 115° C. and that of the head has not exceeded 102° C.

To the concentrated solution, 1.3 mol of chlorine are then added at 100° C. with stirring. The chlorine is added slowly (6 hours) and the temperature of the reaction medium is maintained in the region of 100° C. (exothermic reaction).

Distillation of the antimony pentachloride is then performed under a pressure of 4 kPa. Under this pressure, this compound has a boiling point close to 81–83° C. An increase in distillation foot temperature to 111° C. yields a distillate of 251 g. The latter distillate takes the form of a yellow liquid which contains 40% by weight of total antimony, corresponding to an $SbCl_5$ content of more than 98%. At this stage, 83% of the antimony contained in the initial crude product has been recovered in the form of distilled $SbCl_5$; the purity of the latter is sufficient for a subsequent treatment before recycling not to be necessitated.

Example 2

The procedure is as in Example 1, except as regards the final step of distillation of the antimony pentachloride. In effect, after the majority of the latter has been distilled (foot temperature 102° C.), the distillation is momentarily stopped in order to chlorinate the antimony trichloride resulting from the thermal reduction of a portion of the antimony pentachloride; to this end, 0.3 mol of chlorine is added. After this chlorination, distillation of the antimony pentachloride is completed. This modification enables the degree of recovery of the antimony to be improved (271 g of $SbCl_5$ recovered, equivalent to a degree of recovery of Sb in the region of 90%).

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. Process for recovering the antimony contained in a solution of used antimony-containing catalyst, emanating from units for the fluorination or chlorofluorination of halogenated hydrocarbons comprising at least two carbon atoms, said solution of used catalyst containing, in addition, various organic compounds consisting essentially of olefins and/or olefin precursors, consisting of:

(a) concentrating the solution of seed catalyst to the limit of distillation of antimony trichloride, at a temperature of between 70 to 140° C., with a mole ratio of (olefins+olefin precursors)/antimony V of greater than 1 and without the addition of intermediary substances, then (b) adding chlorine to the concentrated solution to convert $SbCl_3$ to $SbCl_5$, this chlorination being performed at a temperature of between 75 to 120° C. and with a mole ratio $Cl_2/SbCl_3$ equal to at least 1.3, and finally (c) distilling the antimony pentachloride under reduced pressure (1 to 14 kPa) at a temperature not exceeding 120° C.

2. Process according to claim 1, wherein the antimony content of the initial solution is between 3 and 30% by weight.

3. Process according to claim 2, wherein the proportion of $Sb^v$ relative to total Sb is between 0 and 50%.

4. Process according to claim 1, wherein the mole ratio (olefins+olefin precursors)/$Sb^V$ is equal to at least 4.

5. Process according to claim 1, wherein step (a) is performed under reduced pressure.

6. Process according to claim 1, wherein the chlorination step (b) is performed at a temperature of between 80 and 100° C.

7. Process according to claim 1, wherein the distillation (c) of $SbCl_5$ is performed under a pressure of between 2 and 8 kPa.

8. Process according to claim 1, wherein before the end of step (c), chlorine is added in an amount sufficient to reoxidize the antimony trichloride formed during the distillation.

9. Process according to claim 2, wherein the antimony content is between 3 and 15% by weight.

10. Process according to claim 3, wherein the proportion of $Sb^V$ relative to total Sb is between 0 and 20%.

* * * * *

UNITED STATES PATENT AND TRADEMARK OFFICE
CERTIFICATE OF CORRECTION

PATENT NO. : 5,198,199

DATED : March 30, 1993

INVENTOR(S) : LaCroix, et al.

It is certified that error appears in the above-identified patent and that said Letters Patent is hereby corrected as shown below:

Title page, item [54] and column 1, line 4, replace "HALGENATED" with --HALOGENATED--.

[57], line 1, replace "use" with --used--.

Col. 1, line 3 of the title, replace "HALGENATED" with --HALOGENATED--.

Col. 2, line 7, replace "CCl" with --$CCl_4$--.

Col. 3, line 50, replace "$CF_2Cl$--CH Cl" with --$CF_2Cl$--$CH_2Cl$--.

Col. 4, line 25, replace "$SbCl_2$" with --$SbCl_3$--.

Col. 6, line 20, replace "seed" with --used--.

Signed and Sealed this

Fourteenth Day of December, 1993

*Attest:*

BRUCE LEHMAN

*Attesting Officer*     Commissioner of Patents and Trademarks